E. C. SHULER & S. COHEN.
SIGNAL FOR AUTOMOBILES AND OTHER VEHICLES.
APPLICATION FILED OCT. 11, 1913.

1,128,066.

Patented Feb. 9, 1915.

UNITED STATES PATENT OFFICE.

EDWARD C. SHULER AND SAMUEL COHEN, OF DOVER, NEW JERSEY.

SIGNAL FOR AUTOMOBILES AND OTHER VEHICLES.

1,128,066.   Specification of Letters Patent.   Patented Feb. 9, 1915.

Application filed October 11, 1913. Serial No. 794,630.

*To all whom it may concern:*

Be it known that we, EDWARD C. SHULER and SAMUEL COHEN, citizens of the United States, residing at Dover, in the county of Morris and State of New Jersey, have invented certain new and useful Improvements in Signals for Automobiles and other Vehicles, of which the following is a specification.

Our invention relates to signals, especially to those adapted for use on automobiles, and has for its object the provision of a novel form of foot operated signal, visible by day or night, which is capable of warning approaching or following vehicles of an intended change in the speed or direction of a moving vehicle.

An important object is to provide a device of this character which may be attached to any vehicle without disturbing or altering any part of the vehicle.

Figure 1:
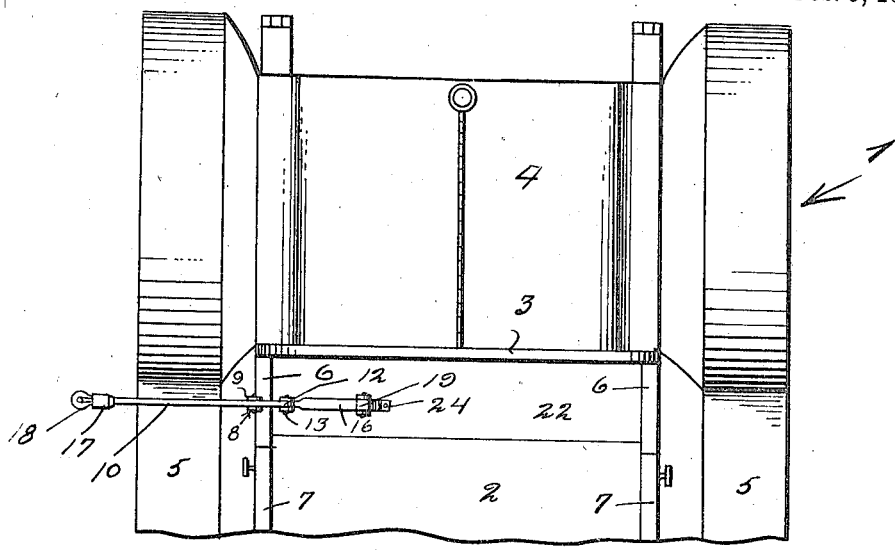
Figure 2:
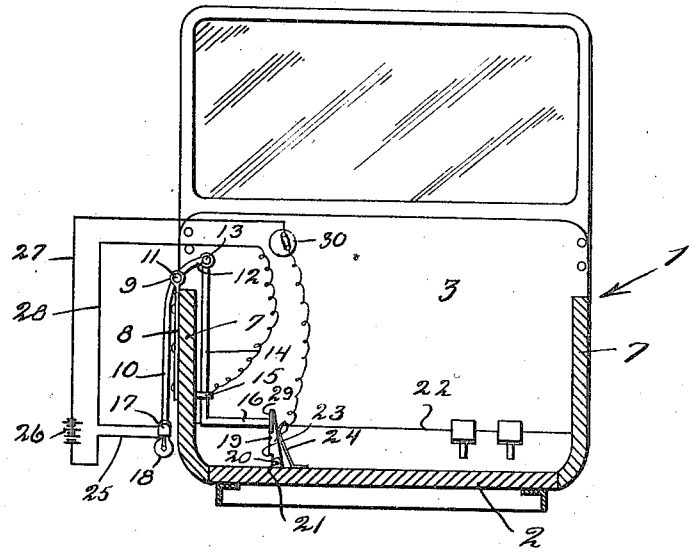

Other objects and advantages such as simplicity, cheapness, efficiency, durability and the general improvement of the art will be brought out in the following specification and illustrated in the accompanying drawings, in which:

Figure 1 is a fragmentary top plan view of an automobile having our improved device attached thereto, and Fig. 2 is a transverse sectional view thereof.

Referring more particularly to the drawings, the numeral 1 designates a portion of an automobile, as a whole, which is provided with a floor 2, a dash 3, hood 4, running boards 5, the stationary side walls 6 and the doors 7.

Our improved signal device is secured preferably at the stationary side walls 6, and comprises a vertically disposed bracket 8 secured upon one of the walls 6, preferably at the left and provided at its upper end with ears 9. Our signal arm 10 is pivoted, as at 11, between the ears 9 and is connected at its inner end 12, as at 13, with the upper end of a vertically movable lever 14 slidable upon the inner side of the wall 6 and guided by a bracket 15 secured thereto. At its lower end the lever 14 is provided with a horizontally extending portion 16 adapted to be engaged by the foot of the driver of the automobile. From the foregoing it will be obvious that downward pressure upon the portion 16 will pull the lever 14 downwardly, thus elevating the outer end of the signal arm and indicating to other vehicles that the driver intends to make a change in speed or direction. This device obviates the necessity of the driver taking his hand off the steering wheel and extending it laterally from the automobile as a signal, as is a common practice.

At its outer end the signal arm 10 is provided with a socket 17 into which is screwed an electric light bulb 18 which receives current from a small dynamo, storage or dry batteries. The addition of the lamp renders the device visible at night.

During the operation of an automobile, it might be found inadvisable for a driver to keep his foot upon the portion 16 for any appreciable length of time, as there are usually various pedals to be operated, especially when changing the direction of travel. We therefore provide a pawl 19 pivoted as at 20 upon lugs 21 secured upon the floor 2 or inclined platform 22. One edge of the pawl 19 is straight, as shown, and provided with a notch or recess 23. A spring 24 is so disposed as to normally hold the straight edge of the pawl against the end of the portion 16. When the portion 16 is depressed, the spring 24 will cause the notch 23 to engage the end of the portion 16, thus maintaining the signal arm 10 in its elevated position. When it is desired to lower the signal, a simple lateral pressure of the operator's foot against the pawl 19 will cause it to be released from engagement with the portion 16, thus allowing the arm 10 to drop by gravity.

In order to avoid a waste of current by allowing the lamp 18 to remain lighted during a straight course by the automobile, we find it expedient to employ an automatic switch device. A wire 25 is connected with one terminal of the lamp 18 and with a source of current 26 from which a second wire 27 conducts current to the pawl 19. Another wire 28 is connected with the other terminal of the lamp and with the bracket 15. A strip of insulation 29 is secured at the upper portion of the pawl, as shown, and contacts with the end of the portion 16 when the signal is idle, thus preventing the lamp from being lighted. Downward pressure upon the portion 16, however, will cause the portion 16 to pass over the insulation 29 and contact with the metallic portion of the pawl, thus causing the circuit to be complete and allowing current to energize the lamp. When the signal is no longer needed to be displayed, releasing the pressure upon the portion 16 will cause the circuit to be broken when the end contacts with the insulating strip. A switch 30 may preferably be placed in the circuit for cutting off current entirely in the day time.

The arm 10 and the entire length of the vertical lever 14 may be of conducting material, but the bracket 15 and the portion 16 and the lower part of the lever 14 contacting with the bracket 15 and connected with the portion 16, and the pawl 19, must be of conducting material.

Having thus described our invention what we claim is:

1. An automobile signal comprising an arm pivotally mounted intermediate its ends upon the side of an automobile, and adapted to swing in a vertical plane, an electric lamp mounted on the outer end of said arm, a foot lever pivotally connected with the other end of said arm, and a catch member bearing against said foot lever, said catch member breaking an electric circuit including the lamp, when the arm is in its lowered position.

2. An automobile signal comprising an arm pivoted upon an automobile and adapted to extend therefrom, an electric lamp mounted upon the outer end of said arm, a foot lever connected with the other end of said arm, and a pawl adapted to engage said foot lever for maintaining said arm in its extended position, said pawl and said foot lever being conductors in an electric circuit including the lamp, and said pawl being provided with non-conducting material at its point of contact with said foot lever in its highest position.

In testimony whereof we hereto affix our signatures in the presence of two witnesses.

EDWARD C. SHULER.
SAMUEL COHEN.

Witnesses:
EUGENE J. COOPER,
ROBERT A. WELCH.